Dec. 2, 1958 W. J. LARABELL 2,862,227
CARPET RETAINING STAPLE
Filed Oct. 16, 1956
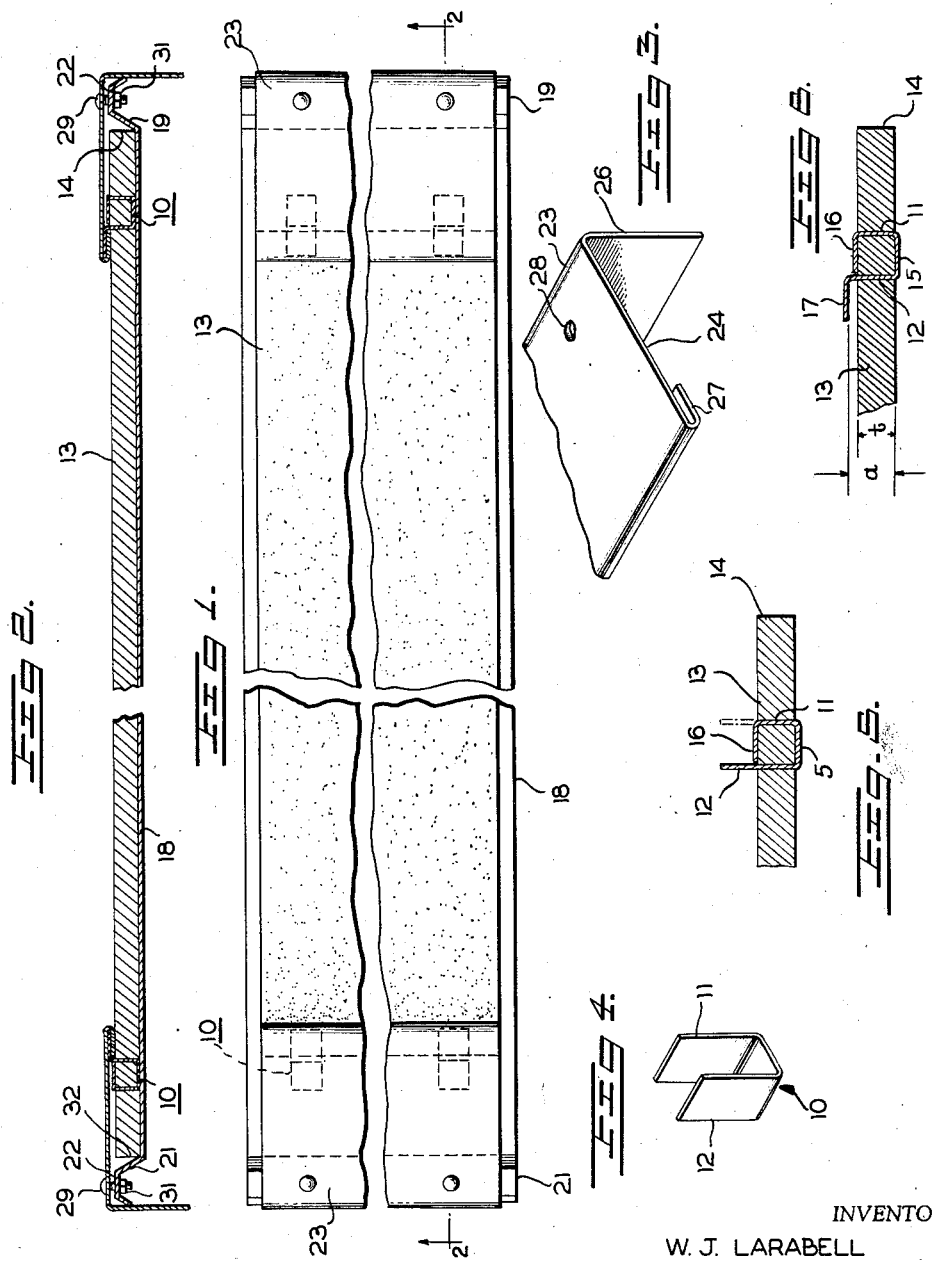
INVENTOR
W. J. LARABELL
BY G. L. DeMott
ATTORNEY

United States Patent Office 2,862,227
Patented Dec. 2, 1958

2,862,227

CARPET RETAINING STAPLE

Wilfred J. Larabell, Detroit, Mich., assignor to General Motors Corporation, Detroit, Mich., a corporation of Delaware Application October 16, 1956, Serial No. 616,159

1 Claim. (Cl. 16—4)

This invention relates to fastening means for holding down floor covers and, more particularly, to fastening means for holding a floor cover taut on an automobile compartment floor.

It is desirable to keep floor covers in automobile compartments taut to avoid the formation of ridges with resulting uneven wear. Furthermore, ridges are unsafe because passengers may trip over such ridges. In the past, floor covers have been kept taut by the use of adhesives, or of mechanical fasteners. However, the use of adhesives is unsatisfactory because removal of the floor cover is difficult without damaging it. Hooks or prongs attached to the floor to hold the floor cover are undesirable because there is the added cost of attaching the hooks or prongs to the floor and the problem of stretching the floor cover over the hooks or prongs. The objects of the instant invention are to solve the above enumerated problems as well as others that accrue in fastening a floor cover to a floor.

One object of this invention is to provide a fastening device to act in conjunction with a floor to keep a floor cover taut.

Another object of this invention is to provide a floor cover fastening means in which a portion of the fastening means is carried by the floor cover rather than the floor to simplify the installation of the floor cover.

A further object of the instant invention is to provide a floor cover fastening device which allows the cover to be easily and rapidly installed in an automobile compartment.

The foregoing objects, with others hereinafter appearing, are attained in the preferred embodiment of the invention illustrated by the figures described below:

Figure 1 is a fragmentary plan view of a floor cover held on a floor by a fastening means embodying the invention.

Figure 2 is a fragmentary cross-section of the fastening device of Figure 1, the section being taken on line 2—2 of Figure 1.

Figure 3 is a fragmentary perspective view of one form of sill plate which may form a part of the invention.

Figure 4 is a perspective view of one form of staple which may be carried by the floor cover for cooperation with the sill plate of Figure 3.

Figures 5 and 6 are sectional views showing steps in the attachment of the staple of Figure 4 to the floor cover.

In general, the subsequently described invention comprises a hooking means protruding through and permanently attached to a floor cover, and a holding means placed in engagement with said hooking means and said floor cover. The holding means is fastened to the floor to secure the cover in place.

Referring first to Figure 4 reference character 10 designates one form of staple which may be attached to the floor cover. This staple is U-shaped with two extending arms 11 and 12 and straight intermediate portion 15, and is made of flat wire material preferably metal so that it may be easily formed but yet have a great deal of toughness. A floor cover 13 which may be a carpet, rug, matting or other suitable material has the staple 10 forced therethrough proximate an edge 14 of the cover 13. The disposition of the staple 10 with relation to the edge 14 is such that the longitudinal dimension of the staple is substantially perpendicular to the edge 14, so that tearing of the staple 10 through the cover 13 to edge 14 is minimized, the two arms 11 and 12 being in line with a force tending to pull the cover, rather than having the force concentrated on a single arm or prong holding the cover.

After staple 10, as shown in Figure 4, is forced through the cover 13, arm 11 is bent over the intermediate portion 15 of the staple 10 in a direction away from the edge 14 to form bent portion 16 which engages the cover 13 in a manner illustrated in Figure 5. The other arm 12 of staple 10 is bent at a point between the end of arm 12 and the portion 16, leaving a space between it and the cover 13, and thus forms a hook 17 which may act as a hooking means carried by the cover 13. The dimension "$a$" is greater than "$t$" by an amount sufficient to permit entry of the lip portion 27 of sill plate 23 between the hook 17 and the upper surface of the cover 13. The completely bent staple 10 is shown in Figure 6.

As part of an automobile compartment, a floor 18 has at its outer edges channel portions 19 and 21 that contain holes 22. The floor cover 13 is simply laid on the floor between the channel portions 19 and 21 with the staples 10 adjacent thereto. A sill plate 23 has two sides 24 and 26 approximately at right angles to each other and at the extreme end of side 24 is a bent-over lip portion 27. It should be noted that sill plate 23 may be an extruded part or a piece of sheet metal bent into shape.

The sill plate 23 is placed into engagement with cover 13 so that lip 27 coacts with hook 17 of staple 10, and a series of holes 28 on sill plate 23 register with holes 22 on channel portion 19.

Bolts 29 are passed through holes 22 and 28 and nuts 31 are fixed thereto in order to fix sill plate 23 to channel portion 19; however, screws, rivets or other suitable fastening means may be used instead of nuts and bolts. With sill plate 23 fixed in the manner just described, a vertical displacement of the floor cover 13 is prevented, and the coaction of hooks 17 on staple 10 with lip 27 on arm 24 prevents a lateral displacement of the cover.

The above-described arrangement of staple 10 in cover 13 and sill plate 23 eliminates the use of attaching hooks or prongs on the floor 18. Since the sill plate 23 may be used to stretch the cover 13 sufficiently, the cover need not be stretched over hooks or prongs in installation to make it taut.

A multiplicity of the aforementioned staples 10 are placed on opposite edges 14 and 32 of the cover 13 in the manner previously described, and a sill plate 23 is fastened to each of the channel portions 19 and 21 so that the plate engages the staples 10 on each side. Arm 24 of the sill plate prevents a vertical displacement of either side of the cover and the cover is securely held against lateral displacement by the coaction of the hooking means with the sill plate 23 or holding means so that no ridges are allowed to form in the cover.

I claim:

In a floor cover retaining device characterized by hook elements adapted to be permanently attached to and carried by the floor cover and coacting with holding means fastened to the floor, the improvement wherein each hook element comprises a staple having spaced first and second parallel arms adapted to pierce the floor cover from beneath and a straight intermediate portion between said arms, each of said arms extending perpendicularly from said intermediate portion, the first of said arms having its terminal portion bent parallel to said intermediate portion and toward the second of said arms and away from the edge of the floor cover upon which each staple is to be retained, said second arm being bent parallel to and in the same direction as the terminal portion of said first arm but at a distance somewhat further removed from said intermediate portion, whereby the first arm serves to secure each staple in place and the second arm provides a hook portion for cooperation with the holding means.

References Cited in the file of this patent

UNITED STATES PATENTS

| | | |
|---|---|---|
| 1,960,949 | Miller et al. | May 29, 1934 |
| 2,055,442 | Jones | Sept. 22, 1936 |
| 2,150,476 | Woodall | Mar. 14, 1939 |
| 2,166,553 | Rennekamp | July 18, 1939 |
| 2,779,048 | Larabell | Jan. 29, 1957 |